US012633520B2

(12) United States Patent
Jito et al.

(10) Patent No.: US 12,633,520 B2
(45) Date of Patent: May 19, 2026

(54) POSITIVE ELECTRODE ACTIVE MATERIAL FOR NON-AQUEOUS ELECTROLYTE SECONDARY CELL, AND NON-AQUEOUS ELECTROLYTE SECONDARY CELL

(71) Applicant: Panasonic Intellectual Property Management Co., Ltd., Kadoma (JP)

(72) Inventors: Daizo Jito, Osaka (JP); Tomohiro Harada, Osaka (JP); Noriko Fukamichi, Osaka (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 527 days.

(21) Appl. No.: 18/266,957

(22) PCT Filed: Dec. 15, 2021

(86) PCT No.: PCT/JP2021/046313
§ 371 (c)(1),
(2) Date: Jun. 13, 2023

(87) PCT Pub. No.: WO2022/138381
PCT Pub. Date: Jun. 30, 2022

(65) Prior Publication Data
US 2023/0395785 A1 Dec. 7, 2023

(30) Foreign Application Priority Data
Dec. 25, 2020 (JP) .............................. JP2020-217346

(51) Int. Cl.
| | |
|---|---|
| *H01M 4/36* | (2006.01) |
| *C01G 53/42* | (2025.01) |
| *H01M 4/02* | (2006.01) |
| *H01M 4/525* | (2010.01) |
| *H01M 10/052* | (2010.01) |
| *H01M 10/42* | (2006.01) |

(52) U.S. Cl.
CPC ............ *H01M 4/364* (2013.01); *C01G 53/42* (2013.01); *H01M 4/525* (2013.01); *H01M*

*10/052* (2013.01); *H01M 10/4235* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2004/0157124 A1* | 8/2004 | Goh ...................... | H01M 4/131 |
| | | | 429/223 |
| 2012/0164533 A1 | 6/2012 | Senoue et al. | |
| 2012/0301792 A1 | 11/2012 | Ryu et al. | |
| 2015/0340692 A1 | 11/2015 | Park et al. | |
| 2020/0083522 A1 | 3/2020 | Han et al. | |

FOREIGN PATENT DOCUMENTS

| | | | | |
|---|---|---|---|---|
| CN | 105514362 A | 4/2016 | | |
| JP | 2012-142156 A | 7/2012 | | |
| JP | 2015086420 A * | 5/2015 | ............... | C25B 1/04 |
| JP | 6058151 B2 | 1/2017 | | |
| JP | 2020-510973 A | 4/2020 | | |
| KR | 10-2010-0036896 A | 4/2010 | | |

OTHER PUBLICATIONS

Abstract of JP-2015086420-A (Year: 2015).*
International Search Report dated Feb. 15, 2022, issued in counterpart International Application No. PCT/JP2021/046313 (2 pages).

* cited by examiner

*Primary Examiner* — Gregg Cantelmo
(74) *Attorney, Agent, or Firm* — WHDA, LLP

(57) ABSTRACT

A positive electrode active material for a non-aqueous electrolyte secondary battery according to one exemplary embodiment comprises: a first lithium transition metal composite oxide represented by general formula $Li_aNi_bM1_{1-b}O_2$ (in the formula, $1.5 \leq a \leq 2.5$, $0.95 \leq b \leq 1.00$, and M1 is at least one metal element excluding Li and Ni); and a second lithium transition metal composite oxide represented by general formula $Li_cNi_{2-c-d}M2_dO_2$ (in the formula, $0 < c \leq 0.5$, $0 \leq d \leq 0.5$, and M2 is at least one metal element excluding Li and Ni).

11 Claims, 2 Drawing Sheets

POSITIVE ELECTRODE ACTIVE MATERIAL FOR NON-AQUEOUS ELECTROLYTE SECONDARY CELL, AND NON-AQUEOUS ELECTROLYTE SECONDARY CELL

CROSS-REFERENCE TO RELATED APPLICATION

This application is a National Phase Application filed under 35 U.S.C. § 371 of International Application No. PCT/JP2021/046313 filed on Dec. 15, 2021 which claims the benefit of priority under 35 U.S.C. § 119 (a) of Japanese Patent Application No. 2020-217346 filed in Japan on Dec. 25, 2020, the contents of which are incorporated herein by reference.

TECHNICAL FIELD

The present disclosure relates to a positive electrode active material for a non-aqueous electrolyte secondary battery and a non-aqueous electrolyte secondary battery using the positive electrode active material.

BACKGROUND

A non-aqueous electrolyte secondary battery includes a positive electrode, a negative electrode, a separator interposed between the positive electrode and the negative electrode, and a non-aqueous electrolyte, and has a structure in which these constituent elements are housed in an exterior body. Since a configuration of the positive electrode, which is a main constituent element of the non-aqueous electrolyte secondary battery, greatly affects battery characteristics, a lot of studies have been conducted on the positive electrode. For example, Patent Literature 1 discloses a lithium secondary battery which contains 1 to 10 wt % of $Li_2NiO_2$ as a positive electrode active material, a mixture selected from Si, SiC, $SiO_x$ (0<x<2), Sn, $SnO_2$, Sb, and Ge as a negative electrode active material, and a carbon-based material, and is intended to improve a capacity retention rate at an initial stage of a cycle test.

CITATION LIST

Patent Literature

Patent Literature 1: JP 6058151 B

SUMMARY

Technical Problem

As described in Patent Literature 1, in a case where $Li_2NiO_2$ is contained in the positive electrode, Li ions for compensating for the irreversibility of the negative electrode are supplied to the negative electrode, and a decrease in capacity retention rate at the initial stage of the cycle test is suppressed. On the other hand, as a result of studies by the present inventors, it has been found that when $Li_2NiO_2$ is added to the positive electrode, the resistance is increased according to charging and discharging. It is considered that $Li_2NiO_2$ releases Li at the time of initial charging and changes to $LiNiO_2$, but $LiNiO_2$ is highly active and easily causes a side reaction with the electrolyte, which causes an increase in battery resistance. The technique of Patent Literature 1 does not consider an increase in resistance during a charge and discharge cycle, and there is still room for improvement.

An object of the present disclosure is to provide a positive electrode active material capable of suppressing an increase in resistance during a charge and discharge cycle of a non-aqueous electrolyte secondary battery.

Solution to Problem

A positive electrode active material for a non-aqueous electrolyte secondary battery according to the present disclosure contains: a first lithium transition metal composite oxide represented by a general formula $Li_aNi_bM1_{1-b}O_2$ (in the formula, 1.5≤a≤2.5, 0.95≤b≤1.00, and M1 is at least one metal element excluding Li and Ni); and a second lithium transition metal composite oxide represented by a general formula $Li_cNi_{2-c-d}M2_dO_2$ (in the formula, 0<c≤0.5, 0≤d≤0.5, and M2 is at least one metal element excluding Li and Ni).

A non-aqueous electrolyte secondary battery according to the present disclosure includes a positive electrode containing the positive electrode active material, a negative electrode, and a non-aqueous electrolyte.

Advantageous Effects of Invention

According to the non-aqueous electrolyte secondary battery using a positive electrode active material according to the present disclosure, an increase in resistance during a charge and discharge cycle can be suppressed.

DESCRIPTION OF EMBODIMENTS

Figure 1:
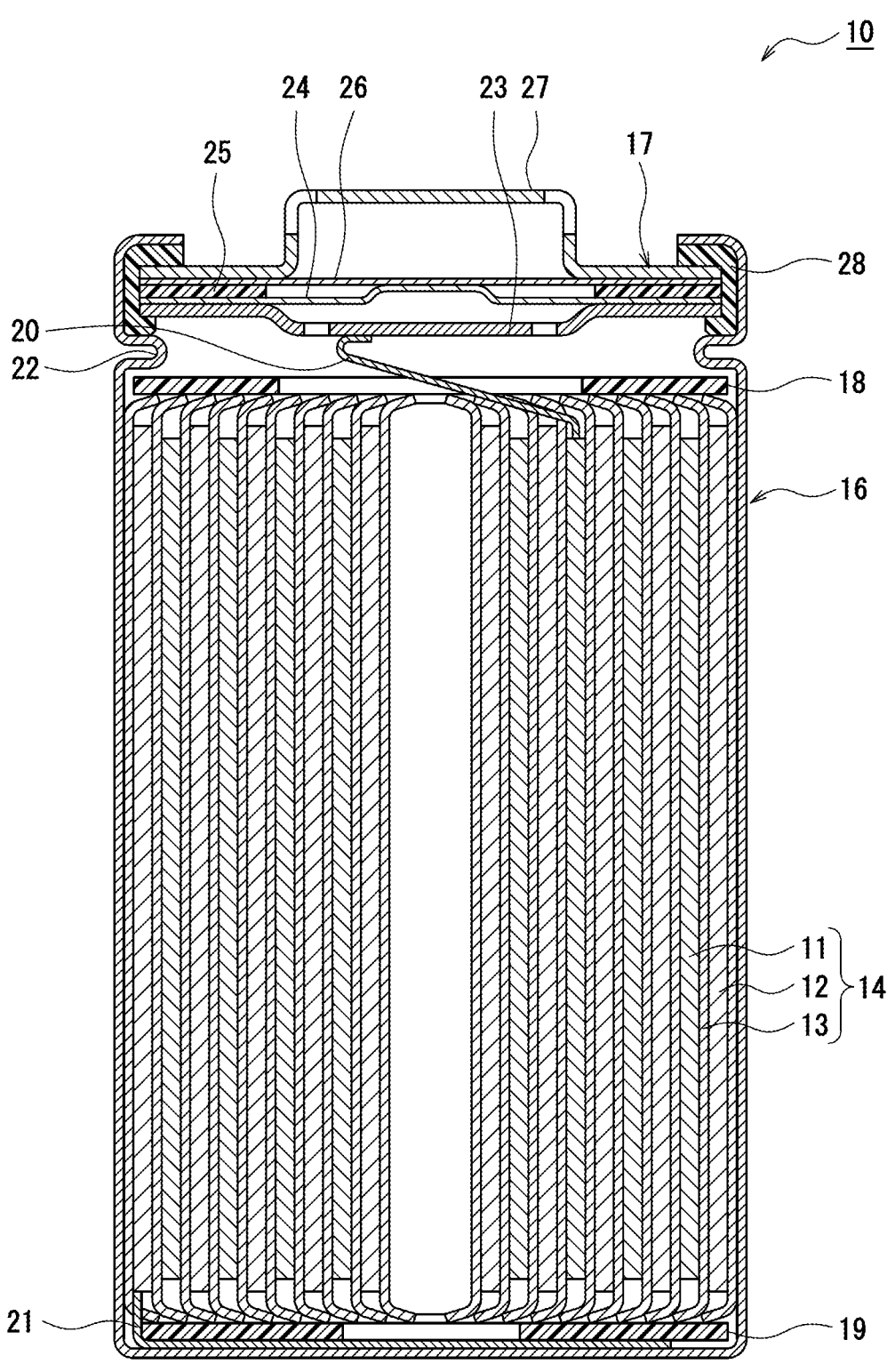
FIG. 1 is a cross-sectional view of a non-aqueous electrolyte secondary battery as an example of an embodiment.

In a non-aqueous electrolyte secondary battery, at the time of initial charging or at an initial stage of a cycle test, a phenomenon is observed, in which some Li ions that have moved from a positive electrode to a negative electrode are not released from the negative electrode during discharging while being absorbed by a negative electrode active material, and a capacity retention rate of the battery is decreased. This phenomenon is also observed in a case where a general carbon-based material such as graphite is used as the negative electrode active material, but is particularly remarkable in a case where a material such as a Si-containing compound is used. Therefore, in order to suppress a decrease in capacity retention rate, a method in which $Li_2NiO_2$ is added to a positive electrode and Li ions for compensating for the irreversibility of a negative electrode are supplied from the positive electrode has been proposed. $Li_2NiO_2$ functions as a supplementary agent for supplying Li ions at the time of initial charging. On the other hand, it has been found that since $Li_2NiO_2$ releases Li at the time of initial charging and changes to highly active $LiNiO_2$, degradation of $LiNiO_2$, deposition of a decomposition reactant on the negative electrode, and the like occur due to a side reaction between $LiNiO_2$ and an electrolyte, and resistance is increased.

As a result of intensive studies to solve the above problems, the present inventors have found that a first lithium transition metal composite oxide represented by a general formula $Li_aNi_bM1_{1-b}O_2$ and a second lithium transition metal composite oxide represented by a general formula $Li_cNi_{2-c-d}M2_dO_2$ are used in combination, such that an increase in resistance of the battery is specifically suppressed. Although the mechanism of suppressing an increase in resistance by the combination of the two kinds of composite oxides is not clear, it is considered that the second composite oxide protects a particle surface of the first composite oxide and suppresses a side reaction between the first composite oxide and the electrolyte after Li release.

Hereinafter, an example of an embodiment of a positive electrode active material according to the present disclosure and a non-aqueous electrolyte secondary battery using the positive electrode active material will be described in detail with reference to the drawings. Note that a selective combination of a plurality of embodiments and modifications described below is included in the present disclosure.

Hereinafter, a cylindrical battery in which a wound electrode assembly 14 is housed in a bottomed cylindrical exterior can 16 will be exemplified, but an exterior body of the battery is not limited to the cylindrical exterior can, and for example, may be a square exterior can (square battery) or a coin-shaped exterior can (coin-shaped battery), or may be an exterior body (laminated battery) configured by a laminate sheet including a metal layer and a resin layer. In addition, the electrode assembly may be a stacked electrode assembly in which a plurality of positive electrodes and a plurality of negative electrodes are alternately stacked with a separator interposed therebetween.

FIG. 1 is a view schematically showing a cross section of a non-aqueous electrolyte secondary battery 10 as an example of an embodiment. As illustrated in FIG. 1, the non-aqueous electrolyte secondary battery 10 includes a wound electrode assembly 14, a non-aqueous electrolyte, and an exterior can 16 housing the electrode assembly 14 and the non-aqueous electrolyte. The electrode assembly 14 includes a positive electrode 11, a negative electrode 12, and a separator 13, and has a wound structure in which the positive electrode 11 and the negative electrode 12 are spirally wound with the separator 13 interposed therebetween. The exterior can 16 is a bottomed cylindrical metal container having one side opened in an axial direction, and an opening of the exterior can 16 is closed by a sealing assembly 17. Hereinafter, for convenience of description, the sealing assembly 17 side of the battery is referred to as an upper side, and a bottom side of the exterior can 16 is referred to as a lower side.

The positive electrode 11, the negative electrode 12, and the separator 13 constituting the electrode assembly 14 are each a belt-like elongated body, and are alternately stacked in a radial direction of the electrode assembly 14 by being spirally wound. The negative electrode 12 is formed to have a size slightly larger than that of the positive electrode 11 in order to prevent precipitation of lithium. That is, the negative electrode 12 is formed to be longer than the positive electrode 11 in a longitudinal direction and a width direction (transverse direction). The separator 13 is formed to have a size slightly larger than at least the positive electrode 11, and two separators 13 are arranged so as to sandwich the positive electrode 11. The electrode assembly 14 includes a positive electrode lead 20 connected to the positive electrode 11 by welding or the like, and a negative electrode lead 21 connected to the negative electrode 12 by welding or the like.

Insulating plates 18 and 19 are disposed above and below the electrode assembly 14, respectively. In the example illustrated in FIG. 1, the positive electrode lead 20 extends through a through-hole of the insulating plate 18 toward a side of the sealing assembly 17, and the negative electrode lead 21 extends through the outside of the insulating plate 19 toward the bottom side of the exterior can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23 becomes a positive electrode terminal. The negative electrode lead 21 is connected to a bottom inner surface of the exterior can 16 by welding or the like, and the exterior can 16 becomes a negative electrode terminal.

As described above, the exterior can 16 is a bottomed cylindrical metal container having one side opened in the axial direction. A gasket 28 is provided between the exterior can 16 and the sealing assembly 17 to secure a sealing property of the inside of the battery and an insulation property between the exterior can 16 and the sealing assembly 17. A groove portion 22 which supports the sealing assembly 17 and has a side portion partially protruding inward is formed in the exterior can 16. The groove portion 22 is preferably formed in an annular shape along a circumferential direction of the exterior can 16, and supports the sealing assembly 17 on an upper surface thereof. The sealing assembly 17 is fixed to an upper portion of the exterior can 16 by the groove portion 22 and an opening end of the exterior can 16 caulked to the sealing assembly 17.

The sealing assembly 17 has a structure in which an internal terminal plate 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected at the respective central parts thereof and the insulating member 25 is interposed between the respective circumferential parts of the vent members 24 and 26. When the internal pressure is increased due to occurrence of an abnormality in the battery, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through an opening of the cap 27.

Figure 2:
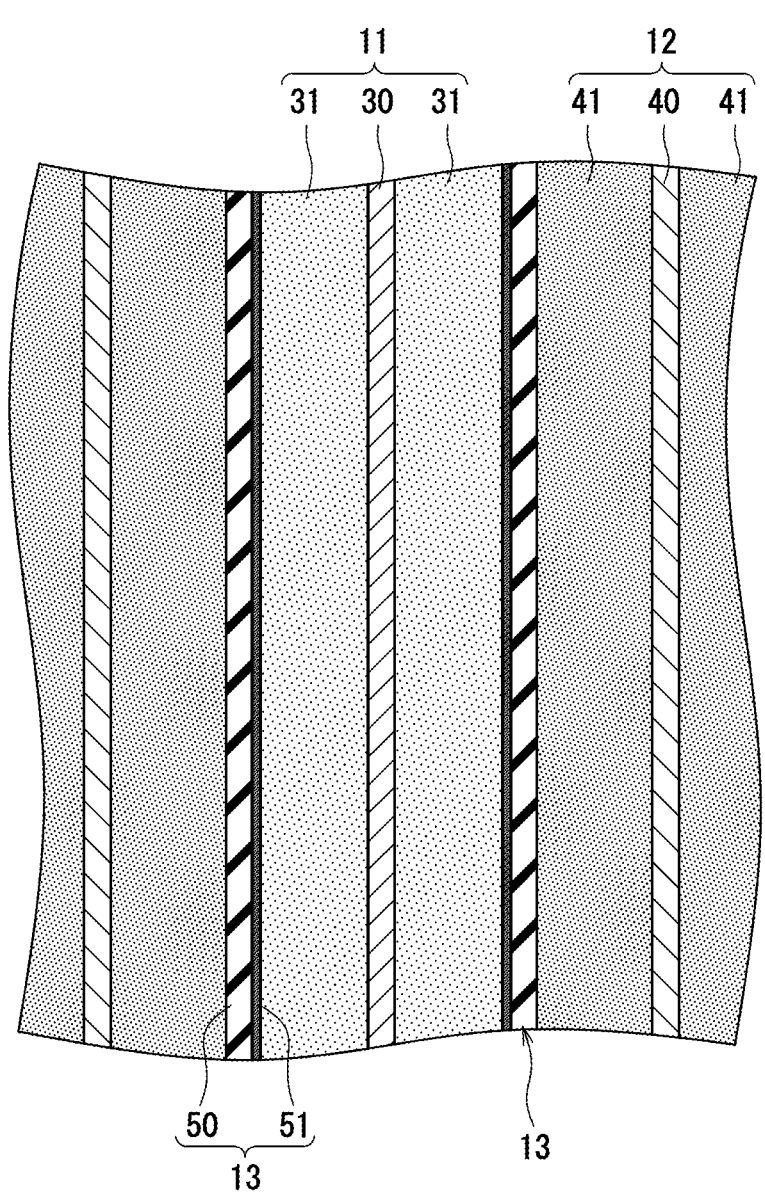
FIG. 2 is a view showing an enlarged part of a cross section of an electrode assembly as an example of an embodiment.

Hereinafter, the positive electrode 11, the negative electrode 12, the separator 13, and the non-aqueous electrolyte constituting the non-aqueous electrolyte secondary battery 10, particularly, the positive electrode 11 will be described in detail with reference to FIG. 2. FIG. 2 is a schematic view showing an enlarged part of a cross section of the electrode assembly 14.

<Positive Electrode>

As illustrated in FIG. 2, the positive electrode 11 includes a positive electrode core 30 and a positive electrode mixture layer 31 formed on at least one surface of the positive electrode core 30. As the positive electrode core 30, a foil of a metal stable in a potential range of the positive electrode 11, such as aluminum or an aluminum alloy, a film in which the metal is disposed on a surface layer, or the like can be used. The positive electrode mixture layer 31 contains a positive electrode active material, a binder, and a conductive agent, and is preferably formed on both surfaces of the positive electrode core 30. As the positive electrode active material, a lithium transition metal composite oxide is used.

The positive electrode 11 can be manufactured by applying a positive electrode mixture slurry containing a positive electrode active material, a binder, a conductive agent, and the like onto the positive electrode core 30, drying and then compressing the coating film, and forming the positive electrode mixture layer 31 on both surfaces of the positive electrode core 30.

Examples of the binder contained in the positive electrode mixture layer 31 include a fluorine resin such as polytetrafluoroethylene (PTFE) or polyvinylidene fluoride (PVdF), polyacrylonitrile (PAN), polyimide, an acrylic resin, and a polyolefin. In addition, these resins may be used in combination with a cellulose derivative such as carboxymethyl cellulose (CMC) or a salt thereof, polyethylene oxide (PEO), or the like. A content of the binder is, for example, greater than or equal to 0.1 mass % and less than or equal to 5 mass % or greater than or equal to 0.5 mass % and less than or equal to 3 mass % with respect to the total mass of the positive electrode mixture layer 31.

Examples of the conductive agent contained in the positive electrode mixture layer 31 include particulate conductive agents such as carbon black, acetylene black, Ketjenblack, and graphite, and fibrous conductive agents such as vapor-grown carbon fibers (VGCF), electrospun carbon fibers, polyacrylonitrile (PAN)-based carbon fibers, pitch-based carbon fibers, graphene, and carbon nanotubes (CNT). A content of the conductive agent is, for example, greater than or equal to 0.01 mass % and less than or equal to 5 mass % or greater than or equal to 0.05 mass % and less than or equal to 3 mass % with respect to the total mass of the positive electrode mixture layer 31.

The positive electrode mixture layer 31 contains at least two kinds of lithium transition metal composite oxides. The first lithium transition metal composite oxide (hereinafter, referred to as a "composite oxide (A)") is a composite oxide represented by a general formula $Li_aNi_bM1_{1-b}O_2$ (in the formula, $1.5 \leq a \leq 2.5$, $0.95 \leq b \leq 1.00$, and M1 is at least one metal element excluding Li and Ni). The second lithium transition metal composite oxide (hereinafter, referred to as a "composite oxide (B)") is a composite oxide represented by a general formula $Li_cNi_{2-c-d}M2_dO_2$ (in the formula, $0 < c \leq 0.5$, $0 \leq d \leq 0.5$, and M2 is at least one metal element excluding Li and Ni).

When the composite oxides (A and B) coexist in the positive electrode mixture layer 31, an increase in resistance at the time of initial charging and discharging is specifically suppressed. It is considered that the composite oxide (B) protects the particle surface of the composite oxide (A), effectively suppresses the deterioration of the particle surface, and suppresses the side reaction between the composite oxide (A) and the electrolyte, and as a result, an increase in resistance is effectively suppressed. Note that the composite oxide (B) may be mixed with the composite oxide (A) by applying a strong shearing force and a strong compressive force, and then the composite oxide (B) may be fixed to the surface of the composite oxide (A).

The composite oxide (B) exerts the above effect by addition in a small amount, but there is a preferred range of the amount of the composite oxide (B) added from the viewpoint of efficiently suppressing an increase in resistance while maintaining a high capacity. A content of the composite oxide (B) is preferably greater than or equal to 0.1 mass % and less than or equal to 20 mass %, and more preferably greater than or equal to 0.5 mass % and less than or equal to 20 mass %, greater than or equal to 1 mass % and less than or equal to 15 mass %, or greater than or equal to 2 mass % and less than or equal to 15 mass %, with respect to the mass of the composite oxides (A and B). When the amount of the composite oxide (B) is within this range, an increase in resistance can be efficiently suppressed.

The positive electrode mixture layer 31 preferably further contains a third lithium transition metal composite oxide (hereinafter, referred to as a "composite oxide (C)"). The composite oxide (C) is a composite oxide represented by a general formula $Li_xNi_{1-y-z}Co_yM3_zO_2$ (in the formula, $0.8 \leq c \leq 1.2$, $0 \leq y \leq 0.2$, $0 < z \leq 0.5$, and M3 is at least one metal element excluding Li, Ni, and Co). In a case where the composite oxides (A and B) and the composite oxide (C) are used in combination, the non-aqueous electrolyte secondary battery 10 having a higher capacity and a highly suppressed increase in resistance can be achieved.

The composite oxide (C) is added to the positive electrode mixture layer 31 in a larger amount than the composite oxides (A and B), for example, from the viewpoint of securing a battery capacity. A content of the composite oxides (A and B) is preferably greater than or equal to 0.1 mass % and less than or equal to 15 mass %, and more preferably greater than or equal to 0.5 mass % and less than or equal to 15 mass %, greater than or equal to 1 mass % and less than or equal to 15 mass %, or greater than or equal to 1 mass % and less than or equal to 10 mass %, with respect to the mass of the composite oxides (A, B, and C). When the amount of the composite oxides (A and B) is within this range, Li ions for compensating for the irreversibility of the negative electrode 12 at the time of initial charging are sufficiently supplied from the positive electrode 11, such that a decrease in capacity retention rate at the initial stage of the cycle test is suppressed, and an increase in resistance is effectively suppressed.

Note that the positive electrode mixture layer 31 may contain a composite oxide other than the composite oxides (A, B, and C) (for example, a lithium transition metal composite oxide not satisfying each of the general formulas) as long as the object of the present disclosure is not impaired. The composite oxides (A, B, and C) are preferably contained in an amount of greater than or equal to 50 mass % with respect to the total mass of the positive electrode mixture layer 31. The total amount of the composite oxides (A. B, and C) is, for example, greater than or equal to 85 mass %, greater than or equal to 90 mass %, or greater than or equal to 95 mass %, with respect to the total mass of the positive electrode mixture layer 31. A preferred example of the content is greater than or equal to 90 mass % and less than or equal to 99 mass % or greater than or equal to 95 mass % and less than or equal to 99 mass %.

[First Lithium Transition Metal Composite Oxide (Composite Oxide (A))]

As described above, the composite oxide (A) is a composite oxide represented by a general formula $Li_aNi_bM1_{1-b}O_2$ (in the formula, $1.5 \leq a \leq 2.5$, $0.95 \leq b \leq 1.00$, and M1 is at least one metal element excluding Li and Ni). A content of the metal element M1 is less than the contents of Li and Ni, and may be less than or equal to 5 mol % and substantially 0 mol % with respect to the total molar amount of metal elements excluding Li. Examples of the metal element M1 include at least one selected from Cu, Sr, Ca, Nb, Si, and Al. Note that a composition of the composite oxide (A) can be analyzed using ICP emission spectrometry.

The composite oxide (A) supplies Li ions to the negative electrode 12 for compensating for the irreversibility of the negative electrode active material at the time of the initial charging, and suppresses a decrease in capacity retention rate at the initial stage of the cycle test. In addition, the composite oxide (A) releases Li at the time of initial charging and changes to $LiNiO_2$ having high activity, for example. It is considered that the side reaction between $LiNiO_2$ and the electrolyte causes degradation of the composite oxide (A), deposition of a decomposition reaction product on the negative electrode 12, and the like to increase the battery resistance, but the increase in resistance is effectively suppressed by the effect of the composite oxide (B).

The composite oxide (A) has, for example, a crystal structure belonging to space group Immm at least before the initial charging and discharging. In addition, the composite oxide (A) has a composition represented by a general formula $Li_aNi_bM1_{1-b}O_2$ ($0.5 \le a \le 1.5$) after the initial charging and discharging. Note that although the composite oxide (A) releases and occludes Li ions to some extent during charging and discharging even after the charging and discharging, it is preferable to add the composite oxide (C) in order to secure the battery capacity. The composite oxide (A) may contain a plurality of kinds of composite oxides having similar compositions, and may contain compounds not satisfying the general formula, for example, $Li_2O$ and NiO.

The composite oxide (A) is, for example, secondary particles formed by aggregation of a plurality of primary particles. An example of a volume-based median diameter (D50) of the composite oxide (A) is greater than or equal to 1 μm and less than or equal to 15 μm or greater than or equal to 1 μm and less than or equal to 10 μm. D50 means a particle size at which a cumulative frequency is 50% from a smaller particle size side in a particle size distribution on a volumetric basis, and is also called a median diameter. The particle size distribution of the secondary particles of the composite oxide can be measured using a laser diffraction type particle size distribution measuring device (for example, MT3000II manufactured by MicrotracBEL Corp.) with water as a dispersion medium.

A particle size of the primary particle of the composite oxide (A) is, for example, greater than or equal to 0.05 μm and less than or equal to 1 μm. The particle size of the primary particle is a diameter of a circumscribed circle in a cross section image of the secondary particle observed with a scanning electron microscope (SEM). In addition, a BET specific surface area of the composite oxide (A) is, for example, greater than or equal to 0.5 $m^2/g$ and less than or equal to 2.5 $m^2/g$. The BET specific surface area is measured according to the BET method (nitrogen adsorption method) described in JIS R1626.

The composite oxide (B) is present in the positive electrode mixture layer 31, for example, in a state of being surrounded by a plurality of composite oxides (A). The particle surfaces of the composite oxides (A and B) are in contact with each other. In this case, it is considered that the interaction between the composite oxides (A and B) is more effectively exhibited, and the effect of suppressing an increase in resistance is enhanced. Note that the composite oxide (B) is not limited to a composite oxide intentionally added, and may be mixed as a by-product of other composite oxides or impurities of other positive electrode materials.

The composite oxide (A) is produced through, for example, a first step of obtaining a mixture by mixing predetermined amounts of a Li raw material and a Ni raw material, and a second step of firing the mixture at higher than or equal to 500° C. and lower than or equal to 800° C. for longer than or equal to 10 hours and shorter than or equal to 30 hours. In the first step, the raw materials may be pulverized as necessary, and a raw material containing the metal element M1 may be added as long as the general formula is satisfied. In addition, in the second step, the mixture may be formed into pellets and then subjected to firing, or may be subjected to crushing treatment after firing. The firing in the second step is performed, for example, in an inert gas atmosphere such as nitrogen.

Examples of the Li raw material include $Li_2CO_3$, LiOH, $Li_2O_2$, $Li_2O$, $LiNO_3$, $LiNO_2$, $Li_2SO_4$, $LiOH \cdot H_2O$, LiH, and LiF. Examples of the Ni raw material include NiO, $Ni(OH)_2$, $NiCO_3$, $NiSO_4$, and $Ni(NO_3)_2$. Examples of the M1 raw material include an oxide, a hydroxide, a carbonate, a nitrate, and a sulfate of M1. A mixing ratio of each raw material is adjusted so that the composition of the composite oxide (A) satisfies the general formula. For example, $Li_2NiO_2$ is obtained by mixing $Li_2O$ and NiO so that a molar ratio of Li to Ni is greater than or equal to 2 and less than or equal to 2.1.

The composite oxide (A) may contain $Li_2O$ and NiO as described above. For example, in a case where $Li_2O$ and NiO are used as raw materials, $Li_2O$ and NiO may be contained in the composite oxide (A) as unreacted components. In addition, when the composite oxide (A) and N-methylpyrrolidone (NMP) are mixed at a mass ratio of 0.1:20, and the mixture is stirred and stored at room temperature for 24 hours, the amount of Li extracted with NMP is preferably less than or equal to 100 μmol/g. By this method, the amount of Li contained in the composite oxide (A) and present in a state of being easily extracted by NMP can be measured. When the amount of Li extracted with NMP is greater than 100 μmol/g, the properties of the positive electrode mixture slurry may be deteriorated.

[Second Lithium Transition Metal Composite Oxide (Composite Oxide (B))]

As described above, the composite oxide (B) is a composite oxide represented by a general formula $Li_cNi_{2-c-d}M2_dO_2$ (in the formula, $0 < c \le 0.5$, $0 \le d \le 0.5$, and M2 is at least one metal element excluding Li and Ni). A content of the metal element M2 is preferably less than the content of Li and Ni, and is, for example, less than 10 mol % or less than 5 mol % with respect to the total molar amount of the metal elements. Examples of the metal element M2 include at least one selected from Cu, Sr, Ca, Nb, Si, and Al.

The composite oxide (B) does not release or occlude Li by charging and discharging, and a composition thereof does not change. In a case where such a composite oxide (B) is used in combination with the composite oxide (A), an increase in resistance of the battery is specifically suppressed. The composite oxide (B) may contain a plurality of types of composite oxides having similar compositions. c in the general formula is more preferably $0.1 \le c \le 0.5$ or $0.2 \le c \le 0.4$. When c is within this range, an increase in resistance is more effectively suppressed. Note that the composition of the composite oxide (B) can be identified from an X-ray diffraction pattern and analyzed using ICP emission spectrometry.

The composite oxide (B) is, for example, a composite oxide having at least one diffraction peak having a peak top at a diffraction angle ($2\theta$) of greater than or equal to 21.40° and less than or equal to 21.65° of radiation X-ray diffraction (light energy: 16 keV). This diffraction peak may have a peak top in a range of $2\theta = 21.40°$ to 21.65°, and may be a broad peak in which the entire peak does not exist in this range. In the X-ray diffraction pattern of the composite oxide (B), for example, one peak top exists in the range of $2\theta = 21.40°$ to 21.65°.

The X-ray diffraction pattern of the composite oxide (B) is obtained by a powder X-ray diffraction method under the following conditions using a radiation facility (beamline BL5S2 at the Aichi Synchrotron Radiation Center).

Light energy: 16 keV

Scan range: 10 to 900

Analysis optical system: Debye-Scherrer method

The obtained data is subjected to peak search with identification analysis software PDXL (manufactured by Rigaku Corporation) to identify the composite oxide (B). In the measurement with the above apparatus. NiO has a peak at 21.36°, and the peak shifts to a high angle side as c in the general formula increases. When c in the general formula is within the above range, a main peak exists at greater than or equal to 21.40° and less than or equal to 21.65°. The composite oxide (B) can be identified by comparison with the JCPDS card including other peaks.

The composite oxide (B) is, for example, particles having a particle size smaller than that of the composite oxide (A), and is secondary particles formed by aggregation of a plurality of primary particles. An example of D50 of the composite oxide (B) is greater than or equal to 1 $\mu$m and less than or equal to 15 $\mu$m, greater than or equal to 1 $\mu$m and less than or equal to 10 $\mu$m, or greater than or equal to 2 $\mu$m and less than or equal to 7 $\mu$m. By setting the particle size of the composite oxide (B) to be smaller than the particle size of the composite oxide (A), a preferred contact state of each particle is obtained, and the effect of suppressing an increase in resistance is enhanced. In addition, a BET specific surface area of the composite oxide (B) is, for example, greater than or equal to 0.5 $m^2$/g and less than or equal to 2.5 $m^2$/g.

The composite oxide (B) is present in the positive electrode mixture layer 31, for example, in a state of being surrounded by a plurality of composite oxides (A). The particle surfaces of the composite oxides (A and B) are in contact with each other. In this case, it is considered that the interaction between the composite oxides (A and B) is more effectively exhibited, and the effect of suppressing an increase in resistance is enhanced. Note that the composite oxide (B) is not limited to a composite oxide intentionally added, and may be mixed as a by-product of other composite oxides or impurities of other positive electrode materials.

The composite oxide (B) is produced through, for example, a first step of obtaining a mixture by mixing predetermined amounts of a Li raw material and a Ni raw material, and a second step of firing the mixture at higher than or equal to 500° C. and lower than or equal to 800° C. for longer than or equal to 10 hours and shorter than or equal to 30 hours. In the first step, the raw materials may be pulverized as necessary, and a raw material containing the metal element M2 may be added as long as the X-ray diffraction pattern of the composite oxide (B) satisfies the above conditions. In addition, in the second step, the mixture may be formed into pellets and then subjected to firing, or may be subjected to crushing treatment after firing. The firing in the second step is performed, for example, in air or in an oxygen atmosphere.

Examples of the Li raw material include $Li_2CO_3$, LiOH, $Li_2O_2$, $Li_2O\cdot LiNO_3$, $LiNO_2$, $Li_2SO_4$, $LiOH\cdot H_2O$, LiH, and LiF. Examples of the Ni raw material include NiO, $Ni(OH)^2$, $NiCO_3$, $NiSO_4$, and $Ni(NO_3)_2$. A mixing ratio of the Li raw material to the Ni raw material is adjusted, for example, so that the X-ray diffraction pattern of the composite oxide (B) satisfies the above conditions, and c in the general formula satisfies the condition of 0<c≤0.5.

[Third Lithium Transition Metal Composite Oxide (Composite Oxide (C))]

The composite oxide (C) is a composite oxide represented by a general formula $Li_xNi_{1-y-z}Co_yM3_zO_2$ (in the formula, 0.8≤x≤1.2, 0≤y≤0.2, 0<z≤0.5, and M3 is at least one metal element excluding Li, Ni, and Co), and contains at least one metal element M3 excluding Li, Ni, and Co as an essential constituent element. In addition, the composite oxide (C) preferably contains Co. However, since Co is particularly rare and expensive, the composite oxide (C) may not substantially contain Co. In a case where the composite oxide (C) contains Co, a content of Co is less than or equal to 20 mol %, and more preferably greater than or equal to 0.1 mol % and less than or equal to 10 mol % or greater than or equal to 0.5 mol % and less than or equal to 5 mol %, with respect to the total molar amount of metal elements excluding Li. Note that a mole fraction of the metal elements in the composite oxide can be measured by inductively coupled plasma (ICP) emission spectrometry.

The composite oxide (C) preferably has the largest content of Ni among the metal elements excluding Li. The content of Ni is preferably greater than or equal to 50 mol %, more preferably greater than or equal to 70 mol %, and particularly preferably greater than or equal to 80 mol %, with respect to the total molar amount of metal elements excluding Li. A preferred example of the content of Ni is greater than or equal to 80 mol % and less than or equal to 97 mol % or greater than or equal to 85 mol % and less than or equal to 95 mol %. That is, a preferred example of (1-y-z) indicating the content of Ni in the general formula is 0.80≤(1-y-z)≤0.97 or 0.85≤(1-y-z)≤0.95.

A preferred example of the composite oxide (C) is a composite oxide containing Ni in an amount of greater than or equal to 80 mol % with respect to the total molar amount of metal elements excluding Li. The capacity of the battery can be increased by increasing a proportion of Ni in the metal elements in the composite oxide (C). In addition, a Ni-rich composite oxide (C) has excellent compatibility with the composite oxide (B), and is also effective in improving cycle characteristics. In the general formula, x representing the content of Li is 0.8≤x≤1.2 or 0.97≤x≤1.2, and the composite oxide (C) may be a composite oxide in which a molar ratio of Li to a transition metal is greater than 1.

The composite oxide (C) contains at least one metal element M3 other than Li, Ni, and Co. The metal element M3 is, for example, at least one selected from Mn, W, Mg, Mo, Nb, Ti, Si, Al, Zr, B, Fe, Cu, Zn, Sn, Na, K, Ba, Sr, and Ca, and more preferably at least one selected from Mn, W, Mg, Mo, Nb, Ti, Si, Sr, Ca, and Al. Among them, it is preferable to contain at least one of Mn and Al. In a case where there are plural elements, the total content of the metal elements M3 is less than or equal to 50 mol %, and more preferably greater than or equal to 0.1 mol % and less than or equal to 20 mol %, greater than or equal to 0.5 mol % and less than or equal to 10 mol %, or greater than or equal to 1 mol % and less than or equal to 5 mol %, with respect to the total molar amount of metal elements excluding Li.

The composite oxide (C) has, for example, a crystal structure belonging to space group R3-m. The composite oxide (C) has a layered structure including a transition metal layer, a Li layer, and an oxygen layer. In this case, the function of the composite oxides (A and B) acts more effectively, and a stable crystal structure is maintained even when charging and discharging are repeated. The composite oxide (C) is, for example, secondary particles formed by aggregation of a plurality of primary particles. An example of D50 of the composite oxide (C) is greater than or equal to 3 $\mu$m and less than or equal to 20 $\mu$m or greater than or equal to 5 $\mu$m and less than or equal to 15 $\mu$m. A particle size of the primary particle of the composite oxide (C) is, for example, greater than or equal to 0.05 μm and less than or equal to 1 μm. In addition, a BET specific surface area of the composite oxide (C) is, for example, greater than or equal to 0.2 m²/g and less than or equal to 2.0 m²/g.

In addition, a compound containing at least one selected from Sr, Ca, W, Mg, Nb, and Al (hereinafter, referred to as a "metal element M4") may be fixed to the particle surface of the composite oxide (C). An M4 compound containing the metal element M4 may be scattered on the particle surface of the composite oxide (C) or may be present in a layer shape so as to cover the entire particle surface. A thickness of the layer of the M4 compound is, for example, greater than or equal to 0.1 nm and less than or equal to 5 nm. It is considered that the M4 compound protects the surface of the composite oxide (C) and also protects the surfaces of the composite oxides (A and B), thereby suppressing the side reaction of the electrolyte on the particle surfaces of the composite oxides (A, B, and C).

The M4 compound is an oxide, a hydroxide, or a carbonate. Specific examples of the M4 compound include SrO, CaO, Sr(OH)₂, Ca(OH)₂, SrCO₃, and CaCO₃. The amount of the M4 compound is, for example, greater than or equal to 0.05 mol % and less than or equal to 0.5 mol % in terms of metal element M4 with respect to the total molar amount of metal elements excluding Li constituting the composite oxide (C). The presence of the M4 compound can be confirmed by energy dispersive X-ray spectroscopy (TEM-EDX). In addition, the metal element M4 can be measured by ICP emission spectrometry of a solution obtained by dissolving the composite oxide (C) in fluoronitric acid.

The composite oxide (C) is produced through, for example, a first step of obtaining a composite oxide containing, for example, Ni, a metal element M3 and the like, a second step of obtaining a mixture by mixing the composite oxide with a Li raw material, and a third step of firing the mixture. In a case where the M4 compound is fixed to the particle surface of the composite oxide (C), a raw material containing a metal element M4 (hereinafter, referred to as an "M4 raw material") may be added in the second step. The compositions, particle sizes, BET specific surface areas, and the like of the composite oxide (C) and the M4 compound can be adjusted by controlling the mixing ratio of the raw materials, the firing conditions in the third step, and the like.

In the first step, for example, an alkali solution such as sodium hydroxide is added dropwise while stirring a solution of a metal salt containing Ni and a metal element such as a metal element M3, and a pH is adjusted to an alkali side (for example, greater than or equal to 8.5 and less than or equal to 12.5), thereby precipitating (coprecipitating) a composite hydroxide containing a metal element. Thereafter, the composite hydroxide is fired to obtain a composite oxide containing Ni, a metal element M3, and the like. A firing temperature is not particularly limited, but is, for example, higher than or equal to 300° C. and lower than or equal to 600° C.

In the second step, a mixture is obtained by mixing the composite oxide obtained in the first step with a Li raw material, and as necessary, an M4 raw material. Examples of the Li raw material include Li₂CO₃, LiOH, Li₂O₂, Li₂O, LiNO₃, LiNO₂, Li₂SO₄, LiOH·H₂O, LiH, and LiF. Examples of the M4 raw material include an oxide, a hydroxide, a carbonate, a nitrate, and a sulfate of M4. A mixing ratio of the composite oxide obtained in the first step to the Li raw material is adjusted, for example, so that a molar ratio of metal elements excluding Li:Li is 1:0.98 to 1:1.22. In addition, a mixing ratio of the composite oxide to the M4 raw material is adjusted, for example, so that a molar ratio of metal elements excluding Li:M4 is 1:0.0005 to 1:0.005.

In the third step, the mixture obtained in the second step is fired at a predetermined temperature for a predetermined time to obtain a fired product. The firing of the mixture is performed by, for example, multi-stage firing including a first firing step of firing at a first temperature rise rate to a first set temperature of higher than or equal to 450° C. and lower than or equal to 680° C. in a firing furnace under an oxygen stream, and a second firing step of firing at a second temperature rise rate to a second set temperature of higher than 680° C. and lower than or equal to 800° C. in a firing furnace under an oxygen stream after the first firing step. The first temperature rise rate is greater than or equal to 1.5° C./min and less than or equal to 5.5° C./min, and the second temperature rise rate is slower than the first temperature rise rate and may be greater than or equal to 0.1° C./min and less than or equal to 3.5° C./min. Note that a plurality of temperature rise rates may be set in each firing step.

A holding time of the first set temperature in the first firing step is, for example, longer than or equal to 0 hours and shorter than or equal to 5 hours or longer than or equal to 0 hours and shorter than or equal to 3 hours. Note that the holding time of the set temperature is a time for maintaining the set temperature after reaching the set temperature. A holding time of the second set temperature in the second firing step is, for example, longer than or equal to 1 hour and shorter than or equal to 10 hours or longer than or equal to 1 hour and shorter than or equal to 5 hours. The mixture may be fired in an oxygen stream having an oxygen concentration of greater than or equal to 60%, and a flow rate of the oxygen stream may be greater than or equal to 0.2 mL/min and less than or equal to 4 mL/min per 10 cm³ of the firing furnace and greater than or equal to 0.3 L/min per 1 kg of the mixture. The fired product may be washed with water, dehydrated, and dried to remove impurities.

Note that the M4 raw material may be fixed to the particle surface of the composite oxide (C) by adding no M4 raw material in the second step, but adding the M4 raw material in the third step during washing with water or drying of the fired product, and performing a heat treatment at higher than or equal to 150° C. and lower than or equal to 400° C. for longer than or equal to 0.5 hours and shorter than or equal to 15 hours.

<Negative Electrode>

As illustrated in FIG. 2, the negative electrode 12 includes a negative electrode core 40 and a negative electrode mixture layer 41 formed on at least one surface of the negative electrode core 40. As the negative electrode core 40, a foil of a metal stable in a potential range of the negative electrode, such as copper or a copper alloy, a film in which the metal is disposed on a surface layer, or the like can be used. The negative electrode mixture layer 41 contains a negative electrode active material and a binder, and is preferably formed on both surfaces of the negative electrode core 40. In addition, a conductive agent may be added to the negative electrode mixture layer 41. The negative electrode 12 can be manufactured by applying a negative electrode mixture slurry containing a negative electrode active material, a binder, and the like onto the negative electrode core 40, drying and then compressing the coating film, and forming the negative electrode mixture layer 41 on both surfaces of the negative electrode core 40.

The negative electrode mixture layer 41 contains, as a negative active material, a carbon-based active material and at least one of at least one selected from Si, Sn, Sb, Mg, and Ge (hereinafter, referred to as a "metal element M5") and an M5 compound containing a metal element M5. A content of the metal element M5 and the M5 compound is, for example, greater than or equal to 0.5 mass % and less than or equal to 30 mass %, and preferably greater than or equal to 1 mass % and less than or equal to 15 mass %, with respect to the total mass of the negative electrode active material.

The metal element M5 may be added to the negative electrode mixture layer 41, but an M5 compound is preferably added to the negative electrode mixture layer 41. Examples of the M5 compound include a first silicon material (SiO) containing SiC, $SnO_2$, a silicon oxide phase, and Si dispersed in the silicon oxide phase, a second silicon material (LSX) containing a lithium silicate phase and Si dispersed in the lithium silicate phase, and a third silicon material (Si—C) containing a carbon phase and Si dispersed in the carbon phase. Among them, SiO, LSX, or Si—C is preferable.

As the carbon-based active material, for example, natural graphite such as flake graphite, artificial graphite such as massive artificial graphite and graphitized mesophase carbon microbeads, and the like are used. A content of the carbon-based active material (graphite) is, for example, greater than or equal to 70 mass % and less than or equal to 99.5 mass % or greater than or equal to 85 mass % and less than or equal to 99 mass % with respect to the mass of the negative electrode active material. In addition, an example of D50 of the carbon-based active material is greater than or equal to 1 μm and less than or equal to 20 μm or greater than or equal to 2 μm and less than or equal to 15 μm. By using the carbon-based active material and the M5 compound in combination, it is possible to increase the capacity while maintaining excellent cycle characteristics.

SiO and LSX are particles whose D50 is smaller than D50 of graphite, for example. An example of D50 of SiO and LSX is greater than or equal to 1 μm and less than or equal to 15 μm or greater than or equal to 3 μm and less than or equal to 10 μm. A conductive layer formed of a material having high conductivity may be formed on particle surfaces of SiO and LSX. An example of a preferred conductive layer is a carbon coating film formed of a carbon material. A thickness of the conductive layer is preferably greater than or equal to 1 nm and less than or equal to 200 nm or greater than or equal to 5 nm and less than or equal to 100 nm in consideration of securing conductivity and diffusibility of Li ions into the particle.

SiO has a particle structure in which fine Si particles are dispersed in a silicon oxide phase. Preferred SiO has a sea-island structure in which fine Si particles are substantially uniformly dispersed in an amorphous silicon oxide matrix, and is represented by a general formula $SiO_x$ ($0<x\leq2$). The silicon oxide phase is composed of an assembly of particles finer than the Si particles. A content ratio of the Si particles is preferably greater than or equal to 35 mass % and less than or equal to 75 mass % with respect to the total mass of SiO from the viewpoint of achieving both the battery capacity and the cycle characteristics.

An average particle size of the Si particles dispersed in the silicon oxide phase is, for example, less than or equal to 500 nm, and preferably less than or equal to 200 nm or less than or equal to 50 nm before charging and discharging. After charging and discharging, the average particle size is, for example, less than or equal to 400 nm or less than or equal to 100 nm. The average particle size of the Si particles is obtained as an average vale of the longest diameters of 100 Si particles obtained by observing SiO particle cross sections using SEM or a transmission electron microscope (TEM) (the same applied to LSX and Si—C).

LSX has a particle structure in which fine Si particles are dispersed in a lithium silicate phase. Preferred LSX has a sea-island structure in which fine Si particles are substantially uniformly dispersed in a lithium silicate matrix. The lithium silicate phase is composed of an assembly of particles finer than the Si particles. As in the case of SiO, a content ratio of the Si particles is preferably greater than or equal to 35 mass % and less than or equal to 75 mass % with respect to the total mass of LSX. In addition, an average particle size of the Si particles is, for example, less than or equal to 500 nm, and preferably less than or equal to 200 nm or less than or equal to 50 nm before charging and discharging.

The lithium silicate phase is preferably composed of a compound represented by a general formula $Li_{2z}SiO_{(2+z)}$ ($0<z<2$). That is, the lithium silicate phase does not contain $Li_4SiO_4$ ($Z=2$). $Li_4SiO_4$ is an unstable compound and reacts with water to exhibit alkalinity, such that Si may be altered to cause a decrease in charge and discharge capacity. The lithium silicate phase preferably contains $Li_2SiO_3$ ($Z=1$) or $Li_2Si_2O_5$ ($Z=1/2$) as a main component from the viewpoint of stability, ease of preparation, Li ion conductivity, and the like. In a case where $Li_2SiO_3$ or $Li_2Si_2O_5$ is contained as a main component, a content of the main component is preferably greater than 50 mass %, and more preferably greater than or equal to 80 mass %, with respect to the total mass of the lithium silicate phase.

Si—C contains a carbon phase and Si particles dispersed in the carbon phase. A preferred content of the Si particles in Si—C is preferably greater than or equal to 30 mass % and less than or equal to 80 mass %, more preferably greater than or equal to 35 mass % and less than or equal to 75 mass %, and still more preferably greater than or equal to 55 mass % and less than or equal to 70 mass %, from the viewpoint of a high capacity and the like. A preferred average particle size of the Si particles is generally less than or equal to 500 nm, preferably less than or equal to 200 nm, and more preferably less than or equal to 100 nm before charging and discharging. After charging and discharging, the average particle size of the silicon particles is preferably less than or equal to 400 nm and is more preferably less than or equal to 100 nm.

As the binder contained in the negative electrode mixture layer 41, a fluorine resin, PAN, polyimide, an acrylic resin, a polyolefin, or the like can be used as in the case of the positive electrode 11, and in particular, it is preferable to use styrene-butadiene rubber (SBR). In addition, it is preferable that the negative electrode mixture layer 41 further contains CMC or a salt thereof, polyacrylic acid (PAA) or a salt thereof, polyvinyl alcohol (PVA), or the like. Among them, SBR is preferably used in combination with CMC or a salt thereof, or PAA or a salt thereof. A content of the binder is, for example, greater than or equal to 0.1 mass % and less than or equal to 5 mass % with respect to the mass of the negative electrode active material.

<Separator>

As illustrated in FIG. 2, the separator 13 has a porous substrate 50 and a surface layer 51 formed on a surface of the substrate 50 facing the positive electrode 11 side. The surface layer 51 is a layer containing inorganic particles and a binder. The surface layer 51 may be formed on both surfaces of the substrate 50, but is preferably formed only on one surface of the substrate 50 facing the positive electrode 11 side from the viewpoint of increasing the capacity and the like. The separator 13 is a porous sheet interposed between the positive electrode 11 and the negative electrode 12 to prevent electrical contact between both electrodes, and has an ion permeation property and an insulation property. A porosity of the separator 13 is, for example, greater than or equal to 30% and less than or equal to 70%. Note that the porosity of the separator 13 is determined by the porosity of the substrate 50.

The substrate 50 is a porous sheet formed of a resin. A thickness of the substrate 50 is, for example, greater than or equal to 5 μm and less than or equal to 50 μm, and more preferably greater than or equal to 10 μm and less than or equal to 30 μm. The resin constituting the substrate 50 is not particularly limited, and specific examples thereof include polyethylene, polypropylene, a polyolefin such as a copolymer of ethylene and α-olefin, polyethylene terephthalate, polybutylene terephthalate, polyphenylene sulfide, polyether ether ketone, polyimide, a fluorine resin, and cellulose. The substrate 50 may have a single-layered structure, and may have a multi-layered structure such as a three-layer structure of polyethylene/polypropylene/polyethylene.

The surface layer 51 is porous similarly to the substrate 50, and has an ion permeation property and an insulation property. A thickness of the surface layer 51 is not particularly limited, but is preferably thinner than the thickness of the substrate 50, and is, for example, greater than or equal to 0.5 μm and less than or equal to 10 μm, and preferably greater than or equal to 1 μm and less than or equal to 6 μm. The surface layer 51 is in contact with the surface of the positive electrode mixture layer 31, and is preferably formed in substantially the entire region of one surface of the substrate 50. The surface layer 51 can be formed, for example, by applying a slurry containing inorganic particles and a binder to the entire surface of the substrate 50 and then drying the coating film.

The surface layer 51 is a layer containing inorganic particles as a main component. A content of the inorganic particles is, for example, greater than or equal to 70 mass %, and preferably greater than or equal to 80 mass %, with respect to the total mass of the surface layer 51. A preferred range of the content of the inorganic particles is greater than or equal to 70 mass % and less than or equal to 99 mass %, greater than or equal to 80 mass % and less than or equal to 98 mass %, or greater than or equal to 85 mass % and less than or equal to 95 mass %. The surface layer 51 has a function of suppressing damage of the separator 13 due to conductive foreign matters, deformation of the separator 13 at the time of abnormal heat generation, and the like. Furthermore, it is considered that the surface layer 51 in contact with the positive electrode 11 suppresses the side reaction of the electrolyte in the positive electrode 11 by interaction with the composite oxide (B), and the cycle characteristics and storage characteristics of the battery are specifically improved by providing the surface layer 51.

Examples of the inorganic particles contained in the surface layer 51 include particles of metal oxide, metal nitride, metal fluoride, metal carbide, metal hydroxides such as aluminum hydroxide (boehmite) and magnesium hydroxide, metal carbonates such as calcium carbonate, magnesium carbonate, and barium carbonate, and metal sulfates such as calcium sulfate, magnesium sulfate, and barium sulfate. The inorganic particles may be used alone or in combination of two or more thereof. D50 of the inorganic particles is, for example, greater than or equal to 0.01 μm and less than or equal to 10 μm, and preferably greater than or equal to 0.05 μm and less than or equal to 5 μm.

Examples of the metal oxide include aluminum oxide (alumina), titanium oxide, magnesium oxide, zirconium oxide, nickel oxide, silicon oxide, and manganese oxide. Examples of the metal nitride include titanium nitride, boron nitride, aluminum nitride, magnesium nitride, and silicon nitride. Examples of the metal fluoride include aluminum fluoride, lithium fluoride, sodium fluoride, magnesium fluoride, calcium fluoride, and barium fluoride. Examples of the metal carbide include silicon carbide, boron carbide, titanium carbide, and tungsten carbide. From the viewpoint of improving cycle characteristics and storage characteristics, an example of preferred inorganic particles is at least one selected from alumina, boehmite, and barium sulfate.

The binder contained in the surface layer 51 is not particularly limited as long as the binder can fix the inorganic particles to each other, can fix the inorganic particles to the substrate 50, and has electrolyte resistance. For example, the same type of binder as the binder used for the positive electrode mixture layer 31 and the negative electrode mixture layer 41 can be used. Specific examples thereof include a fluorine resin such as PVdF or PTFE, PAN, and an acrylic resin. In addition, a resin having high heat resistance such as an aramid resin may be used. Examples of a preferred binder include at least one selected from an aramid resin and an acrylic resin.

<Non-Aqueous Electrolyte>

The non-aqueous electrolyte contains a non-aqueous solvent and an electrolyte salt dissolved in the non-aqueous solvent. As the non-aqueous solvent, for example, esters, ethers, nitriles such as acetonitrile, amides such as dimethylformamide, a mixed solvent of two or more thereof, and the like can be used. The non-aqueous solvent may contain a halogen-substituted product in which at least some hydrogens in these solvents are substituted with halogen atoms such as fluorine. Examples of the halogen-substituted product include fluorinated cyclic carbonic acid ester such as fluoroethylene carbonate (FEC), fluorinated chain carbonic acid ester, and fluorinated chain carboxylic acid ester such as methyl fluoropropionate (FMP). Note that the non-aqueous electrolyte is not limited to a liquid electrolyte, and may be a solid electrolyte.

The non-aqueous electrolyte contains a sulfonyl imide salt as an electrolyte salt. In the non-aqueous electrolyte secondary battery 10 including the positive electrode 11 containing the composite oxides (A and B) or the composite oxides (A, B, and C), it is considered that a sulfonyl imide salt is added to the non-aqueous electrolyte, such that a preferred protective film is formed on the particle surface of the positive electrode active material, and the side reaction of the electrolyte on the particle surface is suppressed, thereby specifically improving cycle characteristics. A concentration of the sulfonyl imide salt is preferably greater than or equal to 0.05 mol/L and less than or equal to 2.5 mol/L, and more preferably greater than or equal to 0.1 mol/L and less than or equal to 2.0 mol/L or greater than or equal to 0.1 mol/L and less than or equal to 1.5 mol/L. When a content of the sulfonyl imide salt is within the above range, the cycle characteristics can be more effectively improved.

The sulfonyl imide salt added to the non-aqueous electrolyte is preferably lithium sulfonyl imide. Examples of the lithium sulfonyl imide include lithium bis(fluorosulfonyl) imide (LiFSI), lithium bis(trifluoromethanesulfonyl)imide, lithium bis(nonafluorobutanesulfonyl)imide, and lithium bis (pentafluoroethanesulfonyl)imide (LIBETI). Among them, at least one lithium sulfonyl imide selected from LiFSI and lithium bis(trifluoromethanesulfonyl)imide is preferable. The sulfonyl imide salts may be used alone or in combination of two or more thereof.

The non-aqueous electrolyte may further contain another lithium salt. Examples of the lithium salt include borates such as $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}$ $(C_nF_{2n+1})_x$ (1<x<6, n is 1 or 2), $LiB_{10}Cl_{10}$, LiCl, LiBr, LiI, lithium chloroborane, lithium lower aliphatic carboxylate, $Li_2B_4O_7$, and $Li(B(C_2O_4)F_2)$. Among them, $LiPF_6$ is preferably used from the viewpoint of ion conductivity, electrochemical stability, and the like.

It is preferable that lithium sulfonyl imide and the second lithium salt coexist in the non-aqueous electrolyte. In this case, a combination of LiFSI and $LiPF_6$ is particularly preferable. Even in a case where the second lithium salt is contained, a concentration of the lithium sulfonyl imide is adjusted to, for example, the above range. As a specific example, the concentration of the lithium sulfonyl imide is greater than or equal to 0.1 mol/L and less than or equal to 1.5 mol/L, and the total concentration of lithium salts is greater than or equal to 1.5 mol/L and less than or equal to 2.5 mol/L. The concentration of the lithium sulfonyl imide is, for example, greater than or equal to 30% and less than or equal to 70% of the concentration of the lithium salts contained in the non-aqueous electrolyte.

In addition, the non-aqueous electrolyte may contain additives such as vinylene carbonate (VC), ethylene sulfite (ES), cyclohexylbenzene (CHB), ortho-terphenyl (OTP), and a propane sultone-based compound. Among them, VC is preferably added from the viewpoint of increasing the capacity and the like. A concentration of the additives is not particularly limited, but is, for example, greater than or equal to 0.1 mass % and less than or equal to 5 mass %.

As the non-aqueous solvent, esters and ethers are used as described above. Examples of the esters include cyclic carbonates such as ethylene carbonate (EC), propylene carbonate (PC), and butylene carbonate, chain carbonates such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP), and ethyl propionate (EP).

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

EXAMPLES

Hereinafter, the present disclosure will be further described with reference to Examples, but the present disclosure is not limited to these Examples.

Experimental Example 1

Example 1

[Synthesis of Composite Oxide (A1)]

$Li_2O$ and NiO were weighed so that a molar ratio of Li to Ni was 2.05:1, and $Li_2O$ and NiO were mixed while being pulverized to prepare a mixture. Next, the mixture was fired at 650° C. for 20 hours in a nitrogen atmosphere and further crushed to obtain a composite oxide (A1). $Li_2NiO_2$, $Li_2O$, and NiO were contained in the composite oxide (A1), and a crystal structure belonging to space group Immm was identified by an X-ray diffraction method. When the composite oxide (A) and NMP were mixed at a mass ratio of 0.1:20, and the mixture was stirred and stored at room temperature for 24 hours, the amount of Li extracted with NMP was 87 μmol/g. D50 of the composite oxide (A1) measured using MT3000II manufactured by MicrotracBEL Corp. with water as a dispersion medium was 10 μm (the same was applied to the measurement method).

[Synthesis of Composite Oxide (B1)]

$Li_2O$ and NiO were weighed so that a molar ratio of Li to Ni was 0.3:1.7, and $Li_2O$ and NiO were mixed while being pulverized to prepare a mixture. Next, the mixture was fired at 650° C. for 20 hours in an oxygen atmosphere and further crushed to obtain a composite oxide (B1). As a result of performing X-ray diffraction measurement on the composite oxide (B1) using the radiation facility, one peak having a peak at 21.48° was confirmed in a range of 2θ=21.40° to 21.65° of the obtained X-ray diffraction pattern. In addition, the composition of the composite oxide (B1) was confirmed to be $Li_{0.3}Ni_{1.7}O_2$ by comparison with the JCPDS card including other peaks. D50 of the composite oxide (B1) was 5 μm.

[Manufacturing of Positive Electrode]

A mixture obtained by mixing the composite oxides (A1 and B1) at a mass ratio of 95:5 was used as a positive electrode active material. The positive electrode active material, acetylene black (AB), and polyvinylidene fluoride (PVdF) were mixed at a solid content mass ratio of 92:5:3, an appropriate amount of NMP was added, and then the mixture was kneaded, thereby preparing a positive electrode mixture slurry. The positive electrode mixture slurry was applied to a positive electrode core formed of an aluminum foil, the coating film was dried, the coating film was rolled using a rolling roller, and then the coating film was cut into a predetermined electrode size, thereby obtaining a positive electrode in which a positive electrode mixture layer was formed on both surfaces of the positive electrode core. Note that an exposed portion where the surface of the positive electrode core was exposed was provided in a part of the positive electrode.

[Preparation of Non-Aqueous Electrolyte]

$LiPF_6$ was dissolved in a mixed solvent obtained by mixing ethylene carbonate (EC) and ethyl methyl carbonate (EMC) at a volume ratio of 3:7 (25° C. 1 atm) at a concentration of 1 mol/L, thereby preparing a non-aqueous electrolyte.

[Manufacturing of Test Cell]

A Li foil was cut into a predetermined size and used as a negative electrode. An electrode assembly was manufactured by attaching an aluminum lead and a nickel lead to an exposed portion of the manufactured positive electrode and a predetermined portion of the negative electrode, respectively, and facing the positive electrode and the negative electrode with a polyolefin separator interposed therebetween. The electrode assembly was housed in an exterior body, the prepared non-aqueous electrolyte was injected, and then an opening of the exterior body was sealed, thereby obtaining a test cell.

Example 2

A test cell was manufactured in the same manner as that of Example 1 except that the composite oxides (A1 and B1) were mixed at a mass ratio of 98:2 in the manufacturing of the positive electrode.

Example 3

A test cell was manufactured in the same manner as that of Example 1 except that the composite oxides (A1 and B1) were mixed at a mass ratio of 90:10 in the manufacturing of the positive electrode.

Example 4

A test cell was manufactured in the same manner as that of Example 1 except that the composite oxides (A1 and B1) were mixed at a mass ratio of 85:15 in the manufacturing of the positive electrode.

Example 5

A test cell was manufactured in the same manner as that of Example 1 except that $Li_2O$ and NiO were mixed so that a molar ratio of Li to Ni was 0.2:1.8 to synthesize a composite oxide (B2).

Example 6

A test cell was manufactured in the same manner as that of Example 1 except that $Li_2O$ and NiO were mixed so that a molar ratio of Li to Ni was 0.5:1.5 to synthesize a composite oxide (B3).

Comparative Example 1

A test cell was manufactured in the same manner as that of Example 1 except that the composite oxide (B1) was not used in the manufacturing of the positive electrode.

Comparative Example 2

A test cell was manufactured in the same manner as that of Example 1 except that the following composite oxide (B10) was used instead of the composite oxide (B1) in the manufacturing of the positive electrode.
[Synthesis of Composite Oxide (B10)]

$Li_2O$ and NiO were weighed so that a molar ratio of Li to Ni was 0.7:1.3, and $Li_2O$ and NiO were mixed while being pulverized to prepare a mixture. Next, the mixture was fired at 650° C. for 20 hours in an oxygen atmosphere and further crushed to obtain a composite oxide (B10).

Comparative Example 3

A test cell was manufactured in the same manner as that of Example 1 except that nickel oxide (B11) was used instead of the composite oxide (B1) in the manufacturing of the positive electrode.

A resistance increase rate of each of the test cells of Examples and Comparative Examples was evaluated by the following method. The evaluation results are shown in Table 1 together with the configuration of the positive electrode. The resistivity shown in Table 1 is a relative value when the resistance increase rate of the test cell of Comparative Example 1 is used as a reference (100).
[Evaluation of Resistance Increase Rate]

The resistance after 1 cycle and the resistance after 15 cycles of the following cycle test were obtained using Battery HiTESTER BT3562 (measurement source frequency: 1 kHz) manufactured by Hioki E.E. Corporation, and the resistance increase rate was calculated by the following equation.

Resistance increase rate=(Resistance after 15 cycles−resistance after 1 cycle)/(Resistance after 1 cycle)

<Cycle Test>

The test cell was subjected to constant current charge at 0.3 C until a battery voltage reached 4.3 V. and then was subjected to constant voltage charge at 4.3 V until a current value reached 0.02 C, under a temperature environment at 25° C. Thereafter, constant current discharge was performed at 0.05 C until a battery voltage reached 2.5 V. The charge and discharge cycle was repeated 15 times.

TABLE 1

| | Positive electrode | | | | Resis- |
| | Composite oxide A Content | Composite oxide B $Li_cNi_{2-c}O_2$ | | | tance |
| | | Content | Value of c | Peak top 2θ | increase rate |
|---|---|---|---|---|---|
| Example 1 | 95 wt % | 5 wt % | 0.3 | 21.48° | 98.0 |
| Example 2 | 98 wt % | 2 wt % | 0.3 | 21.48° | 98.5 |
| Example 3 | 90 wt % | 10 wt % | 0.3 | 21.48° | 97.9 |
| Example 4 | 85 wt % | 15 wt % | 0.3 | 21.48° | 97.4 |
| Example 5 | 95 wt % | 5 wt % | 0.2 | 21.43° | 97.9 |
| Example 6 | 95 wt % | 5 wt % | 0.5 | 21.60° | 98.1 |
| Comparative Example 1 | 100 wt % | — | — | — | 100 |
| Comparative Example 2 | 95 wt % | 5 wt % | 0.7 | 21.73° | 100.4 |
| Comparative Example 3 | 95 wt % | 5 wt % | 0 | 21.36° | 100.5 |

As understood from the results shown in Table 1, in all the test cells of Examples, the increase in resistance after 15 cycles was suppressed to be low as compared with the test cells of Comparative Examples. That is, in a case where a positive electrode containing the composite oxide (A1) and the composite oxides (B1 to B3) is used, the increase in resistance of the battery is specifically suppressed.

In all the case where the composite oxide (A1) is used alone (Comparative Example 1), the case where the composite oxide (B10) that does not have a peak top at 2θ=21.40° to 21.65° and does not satisfy the general formula is used instead of the composite oxides (B1 to B3) (Comparative Example 2), and the case where the nickel oxide (B11) is used (Comparative Example 3), the effect of suppressing the increase in resistance as in Examples cannot be obtained. It was found that when oxides such as B10 and B11 were used in combination, the resistance was rather increased than when the composite oxide (A1) was used alone.

Experimental Example 2

Example 7

[Synthesis of Composite Oxide (C1)]

A composite hydroxide represented by $[Ni_{0.91}Co_{0.04}Al_{0.05}](OH)_2$ obtained by a coprecipitation method was fired at 500° C. for 8 hours to obtain a composite oxide ($Ni_{0.91}Co_{0.04}Al_{0.05}O_2$) (first step). Next, lithium hydroxide (LiOH) and the composite oxide were mixed so that a molar ratio of Li to the total amount of Ni, Co, and Al was 1.02:1, thereby obtaining a mixture. This mixture was fired from room temperature to 650° C. at a temperature rise rate of 2° C./min under an oxygen stream having an oxygen concentration of 95% (flow rate of 2 mL/min per 10 cm³ and 5 L/min per 1 kg of the mixture), and then fired from 650'C to 720° C. at a temperature rise rate of 0.5° C./min. The fired product was washed with water to remove impurities, thereby obtaining a composite oxide (C1).

As a result of ICP analysis, the composition of the composite oxide (C1) was $LiNi_{0.91}Co_{0.04}Al_{0.05}O_2$. In addition, the crystal structure of the composite oxide (C1) was identified to belong to space group R-3m by an X-ray diffraction method. D50 of the composite oxide (C1) measured using MT3000II manufactured by MicrotracBEL Corp. with water as a dispersion medium was 10 μm.

A test cell was manufactured in the same manner as that of Example 1 except that the composite oxides (A1, B1, and C1) were mixed at a mass ratio of 4.75:0.25:95 in the manufacturing of the positive electrode.

Comparative Example 4

A test cell was manufactured in the same manner as that of Example 1 except that the composite oxides (A1 and C1) were mixed at a mass ratio of 5:95 in the manufacturing of the positive electrode.

The cycle test and the evaluation of the resistance increase rate were performed for each of the test cells of Example 7 and Comparative Example 4 in the same manner as those of Experimental Example 1. The evaluation results are shown in Table 2 together with the configuration of the positive electrode. The resistivity shown in Table 1 is a relative value when the resistance increase rate of the test cell of Comparative Example 4 is used as a reference (100).

TABLE 2

| | | Positive electrode | | | | |
|---|---|---|---|---|---|---|
| | Composite | Composite oxide B $Li_cNi_{2-c}O_2$ | | | Composite | Resistance |
| | oxide A Content | Content | Value of c | Peak top 2θ | oxide C Content | Increase rate |
| Example 7 | 4.75 wt % | 0.25 wt % | 0.3 | 21.48° | 95 | 98.8 |
| Comparative Example 4 | 5 wt % | — | — | — | 95 | 100 |

As understood from the results shown in Table 2, in the test cells of Examples, the increase in resistance after 15 cycles was suppressed to be low as compared with the test cells of Comparative Examples. That is, even in a case where the composite oxide (C1) is mixed, when a positive electrode containing the composite oxide (A1) and the composite oxide (B1) is used, the increase in resistance of the battery is specifically suppressed.

In Example 7, since the positive electrode active material used in Example 1 and the composite oxide (C1) were mixed at a weight ratio of 5:95, and the increase in resistance was suppressed, it was presumed that even in a case where the positive electrode active materials of Examples 2 to 6 were mixed with the composite oxide (C1), the same effect was exhibited.

REFERENCE SIGNS LIST

10 Non-aqueous electrolyte secondary battery
11 Positive electrode
12 Negative electrode
13 Separator
14 Electrode assembly
16 Exterior can
17 Sealing assembly
18, 19 Insulating plate
20 Positive electrode lead
21 Negative electrode lead
22 Groove portion
23 Internal terminal plate
24 Lower vent member
25 Insulating member
26 Upper vent member
27 Cap
28 Gasket
30 Positive electrode core
31 Positive electrode mixture layer
40 Negative electrode core
41 Negative electrode mixture layer

The invention claimed is:

1. A positive electrode active material for a non-aqueous electrolyte secondary battery, comprising:
a first lithium transition metal composite oxide represented by a general formula $Li_aNi_bM1_{1-b}O_2$ (in the formula, $1.5 \leq a \leq 2.5$, $0.95 \leq b \leq 1.00$, and M1 is at least one metal element excluding Li and Ni); and
a second lithium transition metal composite oxide represented by a general formula $Li_cNi_{2-c-d}M2_dO_2$ (in the formula, $0 < c \leq 0.5$, $0 \leq d \leq 0.5$, and M2 is at least one metal element excluding Li and Ni).

2. The positive electrode active material for a non-aqueous electrolyte secondary battery according to claim 1, wherein a content of the second lithium transition metal composite oxide is greater than or equal to 0.1 mass % and less than or equal to 20 mass % with respect to the mass of the first lithium transition metal composite oxide and second lithium transition metal composite oxide.

3. The positive electrode active material for a non-aqueous electrolyte secondary battery according to claim 1, wherein the first lithium transition metal composite oxide has a crystal structure belonging to space group Immm.

4. The positive electrode active material for a non-aqueous electrolyte secondary battery according to claim 1, wherein $Li_2O$ and NiO are contained in the first lithium transition metal composite oxide.

5. The positive electrode active material for a non-aqueous electrolyte secondary battery according to claim 1, wherein the second lithium transition metal composite oxide has at least one diffraction peak having a peak top at a diffraction angle (2θ) of greater than or equal to 21.40° and less than or equal to 21.65° in radiation X-ray diffraction (light energy: 16 keV).

6. The positive electrode active material for a non-aqueous electrolyte secondary battery according to claim 1, further comprising a third lithium transition metal composite oxide represented by a general formula $Li_xNi_{1-y-z}Co_yM3_zO_2$ (in the formula, $0.8 \leq x \leq 1.2$, $0 \leq y \leq 0.2$, $0 < z \leq 0.5$, and M3 is at least one metal element excluding Li, Ni, and Co).

7. The positive electrode active material for a non-aqueous electrolyte secondary battery according to claim 6, wherein a content of the first lithium transition metal composite oxide and second lithium transition metal composite oxide is greater than or equal to 0.1 mass % and less than or equal to 15 mass % with respect to the mass of the first lithium transition metal composite oxide, the second lithium transition metal composite oxide, and the third lithium transition metal composite oxide.

8. The positive electrode active material for a non-aqueous electrolyte secondary battery according to claim 6, wherein the third lithium transition metal composite oxide has a crystal structure belonging to space group R3-m.

9. The positive electrode active material for a non-aqueous electrolyte secondary battery according to claim 6, wherein a compound containing at least one metal element selected from Sr, Ca, W, Mg, Nb, and Al is fixed to a particle surface of the third lithium transition metal composite oxide.

10. The positive electrode active material for a non-aqueous electrolyte secondary battery according to claim 9, wherein the amount of the compound containing at least one metal element selected from Sr, Ca, W, Mg, Nb, and Al is greater than or equal to 0.05 mol % and less than or equal to 0.5 mol % in terms of the metal element with respect to the metal elements excluding Li in the third lithium transition metal composite oxide.

11. A non-aqueous electrolyte secondary battery comprising a positive electrode containing the positive electrode active material for a non-aqueous electrolyte secondary battery according to claim 1, a negative electrode, and a non-aqueous electrolyte.

\* \* \* \* \*